Jan. 5, 1932.  S. H. TEECE  1,839,815

INFINITELY VARIABLE SPEED TRANSMISSION MECHANISM

Filed May 28, 1929

Inventor:
Sidney Hassett Teece
By [signature] Attorney

Patented Jan. 5, 1932

1,839,815

UNITED STATES PATENT OFFICE

SIDNEY HASSETT TEECE, OF BOULIA, QUEENSLAND, AUSTRALIA

INFINITELY VARIABLE SPEED TRANSMISSION MECHANISM

Application filed May 28, 1929, Serial No. 366,658, and in Australia December 18, 1928.

This invention relates to change speed transmission gearing of the infinitely variable type, and has for its primary object to provide an improved variable speed gear, particularly suitable for automobiles, which will provide infinitely variable speed ratios from zero up to the desired maximum.

In its preferred form the invention involves eccentric driving devices adjustably mounted on a driving shaft and connected by rods to uni-directional driving devices or one way clutches mounted around the shaft to be driven. The change of speed ratio between the driving and driven shafts is effected by adjusting the eccentricity of the eccentric driving devices to thereby vary the throw and working speed of the connecting rods which are adapted to operate the one way clutches in proper sequence to thereby impart continuous rotary motion to the shaft to be driven.

Simple and effective means is provided for adjusting the eccentricity of the driving devices whereby the desired speed ratio may be readily obtained without sliding gears into or out of mesh as is necessary with change speed mechanism of the conventional sliding gear type. Preferably the arrangement of parts is such that the mechanism adjusts itself to suit conditions of operation so that the speed or transmission ratio will vary automatically in accordance with variations in the load or resistance to be overcome. This feature of automatic adjustment and selection of the most suitable speed ratios is of particular importance and advantage when the mechanism is applied to automobiles as drivers will thereby be relieved from manual control of the transmission mechanism, and economy in petrol consumption will be obtained.

Referring to the drawings which form part of this specification:—

Figure 1:
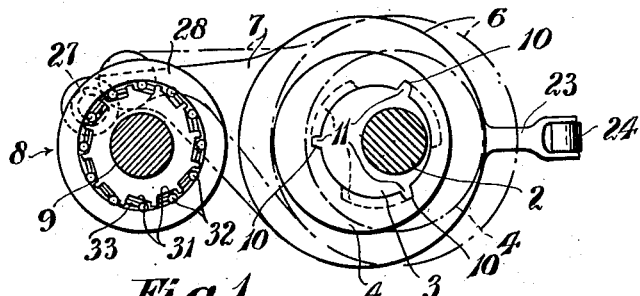
Figure 1 is a side view of an adjustable eccentric driving device and a uni-directional or one way clutch according to a preferred embodiment of the invention.

Referring to Figure 1, the driving shaft 2 has an inner eccentric in the form of a circular cam or cam portion 3 which is encircled by an outer eccentric in the form of a sleeve 4. The bore of the sleeve is eccentric to its outer periphery to the same extent as the cam 3 is eccentric to the driving shaft. The sleeve is encircled by a strap or the big end 6 of a connecting rod 7 which is connected at its other end to a uni-directional or one-way clutch, indicated in general by the numeral 8 on the shaft 9 to be driven. The sleeve 4 is connected to its cam 3, for instance, by co-acting helical grooves 10 and threads 11 formed in adjacent faces, so that by adjustment of the sleeve its outer periphery may be brought either concentric with the driving shaft, or into any desired position of eccentricity up to the maximum. The angle of the threads is such that by applying end pressure to the sleeve 4 it will travel helically around its cam 3 and thus vary the eccentricity of the sleeve to the driving shaft.

The adjustment of the inner and outer eccentrics is thus truly helical but it will be understood that it is the relative circumferential movement or the circumferential component of the helical movement which varies the eccentricity of the outer eccentric to the driving shaft.

At one extreme position, indicated by unbroken lines in Figure 1, the eccentricity of the sleeve 4 augments the eccentricity of its cam 3 so that the connecting rod 7 will have its maximum throw or stroke. At the other extreme position, indicated by broken lines in Figure 1, the eccentricity of the cam 3 is counterbalanced by the opposed eccentricity of the sleeve 4 so that the sleeve and the big end of the connecting rod 7 are concentric with the driving shaft, whereby the connecting rod will not receive any motion. The speed ratio between the driving and driven shafts may be varied infinitely by relative circumferential adjustment of the sleeve 4 upon its cam 3.

A plurality of the driving devices are arranged to act alternately upon the shaft to be driven, as will be described hereinafter, so that the driving stroke of each rod 7 will closely follow or overlap that of another rod.

According to one practical embodiment of the invention a driving shaft 2 may be supported by suitable bearings 13 in a casing 14 (Figure 2) and project from one end thereof for connection to a prime mover, such as the engine of an automobile. The shaft 9 to be driven may also be supported by bearings 15 in the casing and extend adjacent and parallel to the driving shaft.

Figure 3:
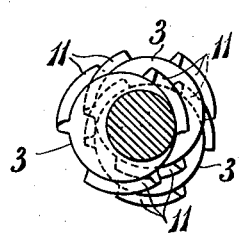
Figure 3 is an end view of the driving shaft of the mechanism.

Preferably three inner eccentrics or cams 3 are fixed to or formed integral with the driving shaft at suitably spaced longitudinal positions within the casing 14. Viewed endwise the cams 3 are equally spaced in a circumferential direction, as seen in Figure 3, so that the maximum eccentricity of each cam occurs at 120° from the other cams. Each inner eccentric or cam 3 is encircled by an outer eccentric or sleeve 4 connected by a rod 7 to a one-way clutch 8 on the driven shaft 9.

Figure 2:
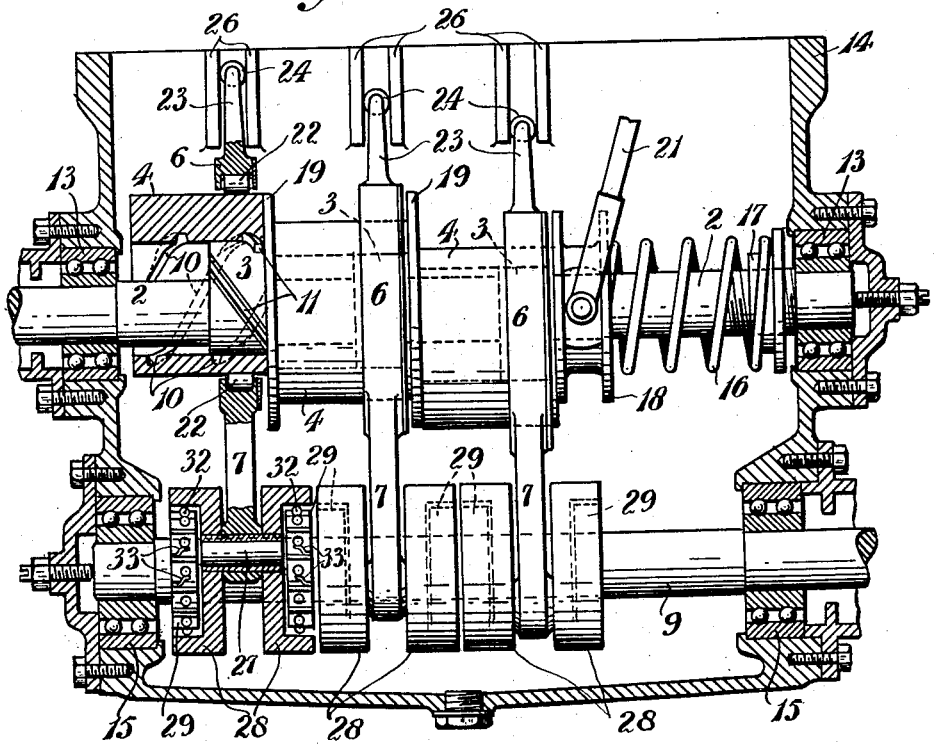
Figure 2 is a sectional elevation of a change speed mechanism embodying parts seen in Figure 1.

Normally, or when the mechanism is at rest, the cam sleeves 4 will be in positions of maximum eccentricity to the driving shaft 2, as in Figure 2, and they may be yieldingly held in such positions by a spring 16 encircling the driving shaft between a fixed collar 17 and an axially slidable thrust collar 18. This thrust collar 18 may be pressed against the end face of the first or last sleeve 4 so as to tend to force it towards the other sleeves. Thrust washers 19 may be interposed between the intermediate sleeve and the end sleeves so that the effect of the spring 16 is transmitted to all sleeves.

To enable the tension or pressure of the spring to be varied the fixed collar 17 may be screwed on the driving shaft and set in any desired position.

When the mechanism is in action the resistance to the rotation of the shaft 9 to be driven, due to the load to be overcome or the work to be done, acts in the opposite direction to the spring 16 and is transmitted through the connecting rods 7 to the sleeves 4. As the driving shaft 2 is rotating, the sleeves will be automatically caused to move helically around their cams 3 against the influence of the spring 16 until the resistance due to the load or work is balanced or counteracted by the spring. The eccentricity of the sleeves 4 to the driving shaft and the length of the stroke of the connecting rods is thus varied automatically in accordance with variations in the load on the driven shaft 9. These adjustments take place rapidly and the result is that throughout operations, the most suitable speed ratios will be selected and obtained automatically by the mechanism.

If it is desired, however, to provide for manual control of the mechanism, the spring 16 may be eliminated and manually operable means such as forked lever 21 connected to the collar 18 may be provided to control the movement of the sleeves 4.

Anti-friction rollers 22 or balls may be arranged between the big end 6 of each connecting rod 7 and the outer periphery of the associated sleeve 4. The connecting rods 7 may have tail pieces 23 fitted with rollers 24 adapted to track in guides 26 in order to guide the rods in their reciprocatory movements.

Any suitable one way or uni-directional clutch may be provided to connect each rod 7 to the shaft 9 but preferably the outer ends of the connecting rods are adapted to encircle pins 27 extending between pairs of rotors or rings 28 which are free to rotate around the driven shaft 9. These rings may co-act with collars 29 fixed to the shaft 9 and having in their outer periphery inclined faces 31 to accommodate relatively small rollers or balls 32. Thus, when the rings 28 are turning in one direction, the balls or rollers will be forced outwardly along the inclined faces 31 so as to lock the rings to the fixed collars and thus transmit the drive to the shaft 9. On reverse turning of the rings due to the idle or return strokes of the rods 7, the balls or rollers move inwardly and free the connection. The balls 32 may be yieldingly urged outwards along the faces 31 by plate springs 33. A retaining ring may be provided to prevent displacement of the balls.

Owing to the circumferential spacing of the driving shaft cams 3 relatively to each other as before-mentioned, the driving effort transmitted by each connecting rod 7 is closely followed or overlapped by the driving effort of the next rod in such a manner as to ensure that a substantially even torque is applied to the shaft 9 to be driven.

Figure 4:
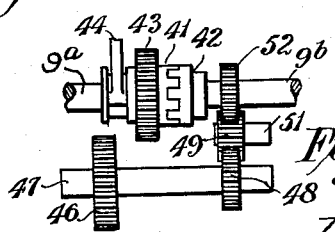
Figure 4 is a diagrammatic view of a form of reversing gear which may be embodied in the mechanism.

If it is desired to provide for reverse driving any suitable reversing mechanism may be incorporated to permit of infinitely variable change of speed ratio in reverse also. According to the arrangement indicated in Figure 4 the driven shaft is in two independently rotatable sections 9a, 9b, which are normally direct coupled by clutches 41, 42. The clutch 41 carries a toothed wheel 43 and is axially slidable, by means of a control lever 44, to disengage the clutches and bring the wheel into mesh with wheel 46 on a lay shaft 47. This shaft carries a pinion 48 meshing with a reverse or idle pinion 49 on a shaft 51, the pinion in turn meshing with another pinion 52 on the shaft section 9b.

It is also to be understood that various modifications, alterations and/or refinements may be introduced into the foregoing arrangement or construction of parts without departing from the spirit and scope of the invention, as defined in the appended claims.

Having now described my invention what I claim as new and desire to secure by Letters Patent is:—

1. Infinitely variable speed transmission mechanism comprising a driving shaft, a plurality of eccentric collars fixed around said shaft, a corresponding number of eccentric sleeves having their bores eccentric to their outer peripheries to the same extent as said collars are eccentric to said driving shaft, screw means for directly connecting each sleeve to an eccentric collar whereby the sleeve will rotate with the collar but is helically adjustable thereon to vary the eccentricity of the sleeve in relation to the driving shaft, a driven shaft, a plurality of one-way clutches on said driven shaft, and a corresponding number of connecting rods, one end of each rod being connected to a one-way clutch and the other end to an eccentric sleeve.

2. Infinitely variable speed transmission mechanism comprising a driving shaft, a plurality of eccentric collars fixed around said shaft, a corresponding number of eccentric sleeves having their bores eccentric to their outer peripheries to the same extent as said collars are eccentric to said driving shaft, screw means for connecting each sleeve to an eccentric collar whereby the sleeve will rotate with the collar but is capable of adjustment to vary the eccentricity of the sleeve in relation to the driving shaft, a driven shaft, a plurality of one-way clutches on said driven shaft, a corresponding number of connecting rods, one end of each rod being connected to a one-way clutch and the other end to an eccentric sleeve, and spring means tending to adjust said eccentric sleeves into positions of maximum eccentricity to said driving shaft.

3. Infinitely variable speed transmission mechanism, comprising a driving shaft, an inner eccentric fast on said shaft, an outer eccentric encircling said inner eccentric, said eccentrics being interconnected by helical threads and grooves formed around the periphery of the inner eccentric and the bore of the outer eccentric, means for applying pressure in a lengthwise direction to said outer eccentric whereby it is adjusted helically around the inner eccentric to vary the eccentricity of the outer eccentric relative to the driving shaft, and means operatively connecting the outer eccentric with a part to be driven.

4. Infinitely variable speed transmission mechanism, comprising a driving shaft, a series of eccentric collars fast on said shaft at longitudinally spaced positions, a corresponding series of eccentric sleeves encircling said collars, separate means connecting each sleeve to a collar whereby the sleeve will rotate with its collar but is helically adjustable thereon to vary the eccentricity of the sleeve in relation to the driving shaft, means for applying pressure in a lengthwise direction to a sleeve at one end of the series thereof so that said sleeve is adjusted helically around its collar and simultaneously transmits the adjusting pressure with like results to the other sleeve or sleeves of the series, and means operatively connecting said sleeves with a part to be driven.

5. Infinitely variable speed transmission mechanism as claimed in claim 4 in combination with resilient means tending to adjust said eccentric sleeves into positions of maximum eccentricity to said driving shaft.

6. Infinitely variable speed transmission mechanism, comprising a driving shaft, a plurality of eccentric collars fast on said shaft, a corresponding number of eccentric sleeves, each sleeve being directly connected to its collar by helical threads and grooves formed around the periphery of the collar and the bore of the sleeve, means for applying pressure lengthwise of said sleeves in order to helically adjust them simultaneously around their collars to vary the eccentricity of the sleeves relative to the driving shaft, a driven shaft, a plurality of one-way clutches on said driven shaft, and a corresponding number of connecting rods forming driving connections between said sleeves and the respective one-way clutches.

In testimony whereof I affix my signature.

SIDNEY HASSETT TEECE.